United States Patent Office 2,802,884
Patented Aug. 13, 1957

2,802,884

ALKYLATION-DEALKYLATION CATALYSTS

Gaetano F. D'Alelio, Pittsburgh, Pa., assignor to Koppers Company, Inc., a corporation of Delaware No Drawing. Application May 31, 1952,
Serial No. 291,057

4 Claims. (Cl. 260—624)

This invention is concerned with the alkylation and dealkylation of aromatic hydroxy compounds. It is more particularly concerned with alkylations and dealkylations of aromatic hydroxy compounds using catalysts having sulfonic acid groups therein. More specifically it is concerned with such alkylations and dealkylations using as catalysts cation-exchange resins having sulfonic acid groups therein and fusible aqueous-alkali-soluble low molecular weight polymers having sulfonic acid groups therein.

By means of this invention it is possible to introduce into various aromatic hydroxy compounds described below secondary and tertiary alkyl groups. Further, the catalysts of the invention are useful for the removal of such alkyl groups from alkyl aromatic hydroxy compounds.

Generally, the alkylations of this invention can be accomplished by simply admixing a small quantity of catalyst with the aromatic hydroxy compound, adding to the mixture an alkylating agent, and maintaining the reaction mixture at an appropriate temperature for a suitable period of time; the catalyst is thereafter removed and the alkylated aromatic hydroxy compound recovered from the reaction mixture by known methods, for example, fractional distillation. Similarly, the dealkylations of the invention can be carried out by admixing a small quantity of catalyst with an alkyl aromatic hydroxy compound, either in the presence or absence of an acceptor, and maintaining the mixture at an appropriate temperature for a suitable period of time; the catalyst is thereafter separated and the dealkylated aromatic hydroxy compound recovered by usual methods such as, for example, fractional distillation.

It will be noted that catalysts of this invention can be removed easily from the reaction mixtures. The cation-exchange resins are insoluble and can be removed easily by filtration, decantation, etc., thus avoiding the troublesome separation step generally encountered with the use of strong acid, Friedel-Crafts type or ionic-type catalysts. This step usually involves a dilution with water or other preferential solvent for the catalyst and sometimes a neutralization and washing out of the catalyst residues from the product, which treatment very often results in emulsions or in the carrying of some of the product into the water or solvent layer. In addition these catalysts are usually not easily recovered for reuse and therefore involve a notable expense when considerable amounts of a moderately expensive catalyst are required. These difficulties are overcome by the use of cation-exchange resins.

The cation-exchange resins which may be used advantageously for the processes of the invention are cation-exchange resins having sulfonic acid groups therein, that is, sulfonated divinyl aryl resins, e. g., sulfonated divinyl benzene resins, sulfonated styrene-divinyl benzene resins, etc., sulfonated phenol-formaldehyde resins, sulfonated coal, etc., more fully disclosed in D'Alelio Patents No. 2,593,417 and No. 2,366,007.

On the other hand, the fusible aqueous-alkali-soluble low molecular weight polymers can be removed from the reaction mixtures by filtration or decantation or, after addition of a divalent metal oxide, as a precipitate since the salts of the catalysts with divalent metals, such as calcium, barium, etc., are insoluble. Fusible aqueous-alkali-soluble low molecular weight polymers useful as catalysts in the processes of this invention are illustrated by sulfonated polystyrenes having molecular weights approximately in the range 1,000–60,000 and phenol sulfonic acid-formaldehyde condensation products of a mole ratio of 3/2 or greater. In these latter catalysts it will be noted that the molar ratio of phenolic groups to methylene groups derived from formaldehyde is at least equal to 3/2.

The aromatic hydroxy compounds which are suitable for alkylation in the presence of the catalysts of this invention are illustrated by such compounds as phenol, the cresols, naphthols, xylols, resorcinol, catechol, bis-phenol and the like. The alkyl aromatic hydroxy compounds which can be dealkylated in the presence of the catalysts of the invention are illustrated by the derivatives of the just-mentioned aromatic hydroxy compounds which contain secondary or tertiary alkyl groups. The catalysts have been observed to be particularly effective in dealkylations in which the alkyl group or groups contain at least four carbon atoms as illustrated by, for example, the tertiary-butyl group.

A variety of alkylating agents can be used in the alkylations of this invention, for example, such as, olefins, alcohols, ethers, and alkyl halides. Illustrative of olefins are such compounds as propylene, isobutylene, amylenes, nonenes, docosenes, and tricosenes. Secondary and tertiary alcohols and alkyl halides containing at least three carbon atoms are useful, as illustrated by isopropyl chloride, tert-butyl-chloride and tert-butyl-alcohol and higher alkyl halides and alcohols. It will be realized that the secondary alcohols and alkyl halides are, of course, more sluggish than the tertiary type alkylating agents and best results are obtained generally with the secondary type by using more catalyst and higher reaction temperatures. Under the same alkylating conditions as used with tertiary alcohols and halides, the secondary alcohols and halides generally can be expected to give diminished yields. Further, as the number of carbon atoms increase in the alkylating agent, the reaction tends to become sluggish and requires longer times or higher temperatures. Ethers which are relatively easy to cleave and which upon cleavage yield an olefin having at least three carbon atoms are useful as illustrated by such ethers as, for example, di-tert-butyl-ether.

In connection with tert-butyl-alcohol, it is to be noted that, in the alkylation of phenol using a fusible aqueous-alkali-soluble low molecular weight polymer having sulfonic acid groups therein as a catalyst, it is possible to obtain unexpectedly large yields of 2-tert-butyl-phenol. The same catalyst with other alkylating agents, such as, for example, isobutylene or tert-butyl-chloride, yields, in comparison, predominantly 4-tert-butyl-phenol. This is illustrated in Examples V, VI, VII and VIII.

The practice of the invention is best described by the following examples. These examples serve to illustrate various methods of practicing the invention and are not intended as limitations to the scope of the invention. In these examples and throughout the specification "parts" and "percent" are given in parts and percent by weight.

*Example I*

To 740 parts phenol at a temperature of 100° C. was added 10 parts of 100-mesh resin comprising a sulfonated styrene-divinyl benzene copolymer having an acidity of 6–7 milliequivalents per gram. This resin can be prepared according to the procedures described in U. S. Patent 2,366,007. There was added with stirring over a period of approximately 8 hours 140 parts isobutylene. After reaction the catalyst was filtered off and the reaction mixture fractionated. There was obtained 192 parts 4-tert-butyl-phenol. This is a yield of 51% based on the isobutylene.

When a similar quantity of 10–20 mesh catalyst beads were used in the above reaction in place of the 100-mesh powdered catalyst, there was obtained a 20.4% yield of 4-tert-butyl-phenol.

*Example II*

To 470 parts phenol was added 10 parts of 100-mesh sulfonated coal cation-exchange material ("Zeo-Kark," manufactured by Permutit Company) having an acidity of approximately 1.0 milliequivalents per gram. There was added with stirring over a period of approximately 8 hours 140 parts isobutylene. After reaction the catalyst was filtered off and the reaction mixture fractionated. There was obtained 391 parts 4-tert-butyl-phenol. This is a yield of 24% based on the isobutylene.

*Example III*

965 parts of phenol admixed with 224 parts propylene was passed over a catalyst bed of 100 ml. 10–20 mesh beads of the styrene-divinyl benzene sulfonated catalyst of Example I at 100° C., 500 lbs. p. s. i. and a liquid hour space velocity of 3.6. The length of the run was 4 hours. There was obtained 92 parts ortho-isopropyl phenol and 40 parts meta+para-isopropyl phenol. This is a yield of 19.2% ortho, meta and para-isopropyl phenols based on the isobutylene.

*Example IV*

Amylene and phenol were reacted by using a procedure similar to that outlined in Example III and substituting amylene for the propylene there used. 100 ml. catalyst was used, the reaction temperature was 150–175° C. and the liquid hour space velocity was approximately 2. After each cycle the product was fractionated at atmospheric pressure using a 15 plate column at 2/1 reflux ratio. The material boiling at from 60 to 260° C. was recycled. There was obtained a 52.4% yield (based on phenol charge) of monoamyl phenol and a 18.4% yield of diamyl phenol.

*Example V*

An aqueous-alkali-soluble sulfonated polystyrene was prepared as described in Example I of my presently copending application Serial No. 281,884, filed April 11, 1952. This catalyst had an acidity of 2.62 milliequivalents per gram and was prepared by dissolving 156 grams of low molecular weight polystyrene (of approximate molecular weight of 6,000), in 2970 grams carbon tetrachloride in a 3-neck, 5-liter flask equipped with agitator thermometer and reflux condenser. The solution was cooled in an iced bath to 0.5° C. and 73.2 ml. (130.2 grams) chlorosulfonic acid was added dropwise with agitation and the temperature was maintained at 0.5° C. for 3 hours. The contents of the flask was then allowed to warm to room temperature. The carbon tetrachloride and hydrochloric acid were removed in vacuum in a stream of air at 40° C. and the residue (approximately 200 grams) ground to a fine powder. The product was dissolved in 300 ml. of water and 9.4 grams of approximately 95% sodium hydroxide in 25 ml. water was added. The solution was filtered and several small chunks of insoluble polymer removed. The filtrate was acidified and the water was removed by heating under a vacuum. The polymer had approximately 0.7 sulfonic acid groups per aromatic nucleus.

Isobutylene was passed through a vigorously-stirred mixture of 94 parts phenol and 10 parts of the sulfonated polystyrene at a temperature of 67–70° C. until 108 parts isobutylene had been taken up by the reaction mixture. The reaction product was stirred for approximately 2 hours at 25° C. with a lime slurry containing 4 parts calcium hydroxide. The catalyst was precipitated as its insoluble calcium salt. The mixture was filtered and the oil layer of the filtrate was separated, dried by azeotropic distillation with approximately 250 parts benzene. Upon fractional distillation there was obtained 22.8 parts 2-tert-butyl-phenol, 21.7 parts 4-tert-butyl-phenol, 52.6 parts 2,4-di-tert-butyl-phenol, and 67.9 parts 2,4,6-tri-tert-butyl-phenol. This represents a 82% yield of alkylated phenol based on isobutylene.

*Example VI*

An aqueous-alkali-soluble sulfonated phenol-formaldehyde catalyst was prepared as described in Example II of my presently copending application, Serial No. 281,884, filed April 11, 1952. This catalyst had an acidity of 4.74 milliequivalents per gram and was prepared, as described in my copending application, by adding 13.7 grams of 36.5% formaldehyde slowly to 66.7 grams of 65.4% phenol sulfonic acid cooled to 20° C. in an Erlenmeyer flask. Intermittent cooling in tap water was necessary to keep the reaction temperature at 24–27° C. in the first 4 hours. After standing for 24 hours at room temperature, 25 ml. of 50% sodium hydroxide was added to bring the pH of the turbid brown solution to 9.4. The precipitate which settled out was removed by filtration. The filtrate was acidified with 10 ml. of 96% sulfuric acid and allowed to stand 10 hours. It was then filtered to remove sodium sulfate and 3.1 grams of barium carbonate was added to the filtrate which was shaken intermittently for 1 hour and filtered. The solution was then distilled under water-faucet vacuum in a stream of nitrogen out of a resin flask at 59–60° C. for 20 hrs. The product, a red solid cake, was ground to a fine powder.

A mixture of 376 parts phenol, 99 parts tert-butyl-alcohol and 10 parts sulfonated phenol-formaldehyde catalyst was stirred and maintained at 85–95° C. for 3 hours. The catalyst was separated by decantation and the reaction product was washed successively with water, 5% sodium hydroxide solution and again with water using approximately 250 parts benzene to facilitate separation of the phases. After removing dissolved water by azeotropic distillation of the benzene the material was fractionated by distillation at 20 mm. through a column of approximately 30 theoretical plates. There was obtained 82.7 parts 2-tert-butyl-phenol (40.7% yield), 38.5 parts 4-tert-butyl-phenol (19%) and 32.9 parts 2,4-di-tert-butyl-phenol (23.7%).

*Example VII*

Example VI was repeated except that in place of the sulfonated phenol-formaldehyde catalyst there was used an equal amount of the sulfonated polystyrene catalyst described in Example V. There was obtained a 40% yield of 2-tert-butyl-phenol, 19.3% yield of 4-tert-butyl-phenol and a 24% yield of 2,4-di-tert-butyl-phenol.

It is to be particularly noted from Examples VI, VII and VIII that, using tert-butyl-alcohol as an alkylating agent and the fusible, aqueous-alkali-soluble low molecular weight polymers having sulfonic acid groups therein as the catalyst, it is possible to obtain markedly greater quantities of 2-tert-butyl-phenol than with other catalysts and other alkylating agents such as, for example, isobutylene and tert-butyl-chloride as illustrated by Examples V and VIII.

*Example VIII*

188 parts phenol and 62 parts tert-butyl-chloride was stirred vigorously with 20 parts of the resin of Example VI for 7.5 hours at 40–45° C. The catalyst was separated by decantation and the product treated as in Example VI. There was obtained 9 parts (8.9% yield) 2-tert-butyl-phenol, 62.7 parts (12.4%) 4-tert-butyl-phenol and 1.2 parts (1.4%) 2,4-di-tert-butyl-phenol.

*Example IX*

694 parts isobutylene was added at a constant rate over approximately 24 hours to 670 parts of a 60–40 meta-para-cresol mixture in the presence of 20 grams of the catalyst of Example I and at a temperature at approximately 100° C. The catalyst was removed by filtration and the reaction mixture fractionated. There was obtained 597 parts mono-butyl-cresol, which corresponds to a 29.4% yield based on isobutylene.

Example X

Isobutylene was passed into a vigorously stirred mixture of 108 parts para-cresol and 15 parts of the catalyst of Example VI. The catalyst was separated by decantation and the product treated as in Example VI. There was obtained 85 parts 2-tert-butyl-4-methyl-phenol (52% yield) and 49.3 parts (22.5%) 2,6-di-tert-butyl-4-methyl-phenol.

Example XI

Isobutylene was passed into a vigorously stirred mixture of 108 parts para-cresol and 10 parts of the sulfonated polystyrene catalyst described in Example V until 73.1 parts isobutylene was absorbed. The catalyst was separated by decantation and the reaction product worked up as in Example VII. There was obtained 56.4 parts (34.4% yield) 2-tert-butyl-4-methyl-phenol and 93 (42.4%) 2,6-di-tert-butyl-4-methyl-phenol.

Example XII

A mixture of 216 parts para-cresol, 40 parts tert-butyl-alcohol and 5 parts of the resin of Example VI was vigorously stirred and maintained at 85–95° C. for three hours. The product was stirred for 2 hours at reaction temperature with a slurry containing 2 parts lime. The precipitated catalyst was separated by filtration. The oil layer of the filtrate was dried and fractionated at 20 mm. through a packed column of approximately 30 theoretical plates. There was obtained 74.9 parts (68.8% yield) 2-tert-butyl-4-methyl-phenol and 6.9 parts (9.5%) 2,6-di-tert-butyl-para-cresol based on the tert-butyl-alcohol.

Example XIII

Example XII is repeated substituting for the tert-butyl-alcohol there used an equal molecular quantity of tert-butyl-chloride. Substantially similar results are obtained.

While a limited number of alkylations have been described in the above examples, it will be realized that the catalysts of the invention can be used with a variety of alkylating agents, such as, for example, olefins, alcohols and halides. Further, while tertiary halides and alcohols have been used in the foregoing examples, it is possible to use secondary halides and alcohols, the tertiary type alkylating agent, of course, being most easily utilized. Additionally, while the halides and alcohols have been illustrated with particular reference to the butyl halides and alcohols, other secondary and tertiary alkyl halides and alcohols known to the art as alkylating agents may be used. The above examples illustrate that the catalysts of the invention may be used in varying concentrations and that the reaction temperature may be varied widely depending upon the particular aromatic hydroxy compound and alkylating agent used. It will be realized from the foregoing examples illustrating the alkylation of phenols and cresols that the catalysts of the invention can be utilized for the alkylation of aromatic hydroxy compounds in general and particularly of phenol, the cresols, xylenols, and naphthols. Additionally, these catalysts are useful in the alkylation of dihydric aromatic compounds, such as, for example, resorcinol and catechol.

Example XIV 2,6-di-tert-butyl-para-cresol was dealkylated as follows:
A stirred charge of 110 parts 2,6-di-tert-butyl-para-cresol and 5 parts of the resin of Example V were maintained at a temperature of about 190–200° C. until evolution of isobutylene gas ceased. There was obtained a 93% conversion of the 2,6-di-tert-butyl-para-cresol to para-cresol. When the catalysts of Examples I, II and VI are substituted for the catalyst of Example V in the foregoing procedure substantially similar results are obtained.

Example XV

An exchange alkylation of 2,6-di-tert-butyl-para-cresol and para-cresol was effected using the catalyst of Example V. 110.2 parts 2,6-di-tert-butyl-para-cresol, 160.2 parts para-cresol and 10 parts of the catalyst of Example V were vigorously stirred and maintained at 80–90° C. for approximately 4 hours. The liquid product was cooled to about 25° C. and then stirred for approximately 2 hours with an aqueous lime slurry (4 parts calcium hydroxide in 100 parts water). The precipitated sulfonated polystyrene catalyst was removed by filtration. The organic layer of the filtrate was dried by azeotropic distillation with benzene. The product was distilled at 20 mm. through a packed column of approximately 30 theoretical plates. There was obtained 140.9 parts 2-tert-butyl-para-cresol and 7.5 parts 2,6-di-tert-butyl-para-cresol. This corresponds to a yield of 2-tert-butyl-para-cresol of 92%.

When the catalysts of Examples I, II and VI are substituted for the sulfonated polystyrene catalyst here used substantially similar results are obtained.

It will be realized that the dealkylation and exchange alkylations above described can be effected in the presence of catalysts embraced by this invention with a wide variety of alkyl aromaotic hydroxy compounds. In general, the catalysts are useful for the dealkylation or exchange alkylation of alkyl aromatic hydroxy compounds described in Examples I through XIII, in which the alkyl group contains at least three carbon atoms, and in particular those in which the alkyl group contains at least four carbon atoms.

All of the foregoing examples illustrate the use of the catalysts embraced by the invention without the use of a solvent. These reactions can be effected in the presence of inert solvents such as, for example, petroleum ether, benzene, toluene and the like. Additionally, in the alkylations there can be used as solvents an excess of the material being alkylated as illustrated by the use of excess phenol in Example III. In the dealkylations of the invention, the acceptor may serve as a solvent. In general, aromatic hydroxy compounds and alkyl aromatic hydroxy compounds containing a smaller number of alkyl groups than the substance being dealkylated are useful as acceptors.

As indicated by Example I the particle size and surface character of the catalyst may affect the reaction, possibly due to the fact a greater amount of catalyst surface causes greater catalyst efficiency.

The procedure for contacting the reactants with the catalyst may be varied in a number of ways, such as simple mixing, passing the reactants in a continuous manner, through a fixed bed of the sulfonated catalyst, etc. Moreover, the infusible sulfonated aryl resin catalysts may be in various forms, that is, powered beads, pellets or impregnated or coated on an inert material such as diatomaceous earth, Alundum, coke silica, cinders, porous glass, etc.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

I claim:
1. A process for the alkylation of a phenolic compound free of para substitution and susceptible of ortho alkylation to produce a preponderance of ortho alkylated product selected from the group consisting of phenol, resorcinol, catechol, cresols, xylenols, and naphthols, comprising the step of alkylating said compound employing tertiary-butyl-alcohol as alkylating agent in the presence of a fusible, aqueous-alkali-soluble low molecular weight polymer having sulfonic acid groups therein selected from the group consisting of a sulfonated phenol-formaldehyde polymer containing in the polymer molecule, before sulfonation, phenolic groups and methylene groups derived from formaldehyde in a molar ratio at least equal to 3/2, and a sulfonated polystyrene having a molecular weight in the range 1,000–60,000.

2. A process for the alkylation of phenol to produce a preponderance of 2-tert-butyl-phenol comprising reacting phenol and tertiary-butyl-alcohol in the presence of a fusible, aqueous-alkali-soluble low molecular weight polymer having sulfonic acid groups therein selected from the group consisting of a sulfonated phenol-formaldehyde polymer containing in the polymer molecule, before sulfonation, phenolic groups and methylene groups derived from formaldehyde in a molar ratio at least equal to 3/2, and a sulfonated polystyrene having a molecular weight in the range 1,000–60,000.

3. A process for the alkylation of phenol to produce a preponderance of 2-tert-butyl-phenol comprising reacting phenol and tertiary-butyl-alcohol in the presence of a fusible, aqueous-alkali-soluble low molecular weight polymer comprising a sulfonated phenol-formaldehyde polymer containing in the polymer molecule, before sulfonation, phenolic groups and methylene groups derived from formaldehyde in a molar ratio at least equal to 3/2 and having an acidity of 4.74 milliequivalents per gram.

4. A process for the alkylation of phenol to produce a preponderance of 2-tert-butyl-phenol comprising reacting phenol and tertiary-butyl-alcohol in the presence of a fusible, aqueous-alkali-soluble low molecular weight polymer comprising a sulfonated polystyrene having a molecular weight of approximately 6,000, an acidity of 2.62 milliequivalents per gram and approximately 0.7 sulfonic acid groups per aromatic nucleus.

References Cited in the file of this patent

UNITED STATES PATENTS

| | | |
|---|---|---|
| 1,789,410 | Marshall | Jan. 20, 1931 |
| 1,972,599 | Perkins et al. | Sept. 4, 1934 |
| 2,008,032 | Niederl | July 16, 1935 |
| 2,051,473 | Evans et al. | Aug. 18, 1936 |
| 2,189,805 | Kyrides | Feb. 13, 1940 |
| 2,290,603 | Stevens et al. | July 21, 1942 |
| 2,570,403 | Stevens et al. | Oct. 9, 1951 |

FOREIGN PATENTS

| | | |
|---|---|---|
| 626,095 | Great Britain | July 8, 1949 |

OTHER REFERENCES

Sussman: Ind. Eng. Chem., vol. 38 (Dec. 1946), pp. 1228–30 (3 pp.).